(12) United States Patent
Rundquist et al.

(10) Patent No.: US 8,652,397 B2
(45) Date of Patent: Feb. 18, 2014

(54) ULTRASONIC DEVICE WITH INTEGRATED GAS DELIVERY SYSTEM

(75) Inventors: Victor F. Rundquist, Carrollton, GA (US); Kevin S. Gill, Carrollton, GA (US)

(73) Assignee: Southwire Company, Carrollton, GA (US)

( * ) Notice: Subject to any disclaimer, the term of this patent is extended or adjusted under 35 U.S.C. 154(b) by 121 days.

(21) Appl. No.: 13/270,401

(22) Filed: Oct. 11, 2011

(65) Prior Publication Data

US 2012/0042751 A1    Feb. 23, 2012

Related U.S. Application Data

(63) Continuation-in-part of application No. 13/082,437, filed on Apr. 8, 2011.

(60) Provisional application No. 61/322,324, filed on Apr. 9, 2010.

(51) Int. Cl.
| | |
|---|---|
| *C22B 9/02* | (2006.01) |
| *C22B 9/05* | (2006.01) |
| *C22B 21/06* | (2006.01) |
| *C21C 7/072* | (2006.01) |
| *B06B 3/00* | (2006.01) |
| *B01J 19/10* | (2006.01) |
| *B22D 1/00* | (2006.01) |

(52) U.S. Cl.
USPC .............................. 266/217; 266/265; 75/708

(58) Field of Classification Search
USPC ................................................. 266/217, 265
See application file for complete search history.

(56) References Cited

U.S. PATENT DOCUMENTS

| | | |
|---|---|---|
| 2,820,263 A | 1/1958 | Fruengel |
| 3,162,908 A | 12/1964 | De Luca |
| 3,177,084 A | 4/1965 | Amstein |
| 3,193,889 A | 7/1965 | Lane et al. |
| 3,286,312 A | 11/1966 | Davis et al. |
| 3,434,823 A | 3/1969 | Adamec |
| 3,459,255 A | 8/1969 | Kolle |
| 3,495,104 A | 2/1970 | Burgo et al. |
| 3,521,849 A | 7/1970 | Voss et al. |
| 3,633,898 A | 1/1972 | Josefsson et al. |
| 3,709,722 A | 1/1973 | Corrigan et al. |
| 3,734,480 A | 5/1973 | Zanis et al. |
| 3,794,102 A | 2/1974 | Binder |
| 3,848,847 A | 11/1974 | Komatsu et al. |

(Continued)

FOREIGN PATENT DOCUMENTS

| | | |
|---|---|---|
| CN | 101435064 | 5/2009 |
| DE | 2104843 | 8/1972 |

(Continued)

OTHER PUBLICATIONS

Ohsawa, et al., Article entitled "Effects of Ultrasonic Vibration on Solidification Structures of Cast Iron" (1995) pp. 325-330.

(Continued)

*Primary Examiner* — George Wyszomierski
*Assistant Examiner* — Tima M McGuthry Banks
(74) *Attorney, Agent, or Firm* — Merchant & Gould P.C.

(57) ABSTRACT

Ultrasonic devices having an integrated gas delivery system are described, and these devices can be used to remove dissolved gasses and impurities from molten metals.

29 Claims, 6 Drawing Sheets

(56) References Cited

U.S. PATENT DOCUMENTS

| | | | |
|---|---|---|---|
| 3,858,640 | A | 1/1975 | Sifferlen |
| 3,872,913 | A | 3/1975 | Lohikoski |
| 3,900,947 | A | 8/1975 | Diepers et al. |
| 3,973,750 | A | 8/1976 | Rabinovitch et al. |
| 3,990,498 | A | 11/1976 | Dompas et al. |
| 4,175,609 | A | 11/1979 | El Gammal et al. |
| 4,287,755 | A | 9/1981 | Mansfield |
| 4,316,734 | A | 2/1982 | Spinosa et al. |
| 4,426,244 | A | 1/1984 | Wang |
| 4,485,179 | A | 11/1984 | Brennan et al. |
| 4,564,059 | A | 1/1986 | Dobatkin et al. |
| 4,589,468 | A | 5/1986 | Misera et al. |
| 4,662,431 | A | 5/1987 | Lowry et al. |
| 4,699,636 | A | 10/1987 | Bofinger et al. |
| 4,770,699 | A | 9/1988 | Mountford |
| 4,802,436 | A | 2/1989 | Wilson et al. |
| 5,186,236 | A | 2/1993 | Gabathuler et al. |
| 5,198,187 | A | 3/1993 | Lu et al. |
| 5,333,844 | A | 8/1994 | Holcombe et al. |
| 5,340,379 | A | 8/1994 | Tremblay et al. |
| 5,372,634 | A | 12/1994 | Monahan |
| 5,443,892 | A | 8/1995 | Holcombe et al. |
| 5,527,381 | A | 6/1996 | Waite et al. |
| 5,604,301 | A | 2/1997 | Mountford et al. |
| 5,626,179 | A | 5/1997 | Choudhury et al. |
| 5,656,236 | A | 8/1997 | Waite et al. |
| 5,660,614 | A | 8/1997 | Waite et al. |
| 5,803,948 | A | 9/1998 | Sizov et al. |
| 5,810,037 | A | 9/1998 | Sasaki et al. |
| 5,934,900 | A | 8/1999 | Billings |
| 5,950,706 | A | 9/1999 | Choudhury et al. |
| 5,983,978 | A | 11/1999 | Vining et al. |
| 6,095,957 | A | 8/2000 | Ichino et al. |
| 6,132,532 | A | 10/2000 | Shepelev et al. |
| 6,177,755 | B1 | 1/2001 | Hur |
| 6,277,224 | B1 | 8/2001 | Muesch et al. |
| 6,604,941 | B2 | 8/2003 | Billings |
| 6,629,557 | B2 | 10/2003 | Blucher et al. |
| 6,676,381 | B2 | 1/2004 | Subramanian et al. |
| 6,705,385 | B2 | 3/2004 | Ray et al. |
| 6,776,214 | B2 | 8/2004 | Ray et al. |
| 6,799,626 | B2 | 10/2004 | Ray et al. |
| 6,811,602 | B2 | 11/2004 | Beppu et al. |
| 7,036,556 | B2 | 5/2006 | Caputo et al. |
| 7,297,238 | B2 | 11/2007 | Nayar et al. |
| 7,485,198 | B2 | 2/2009 | Michaluk |
| 7,540,995 | B2 | 6/2009 | Furst et al. |
| 7,582,133 | B2 | 9/2009 | Kelly et al. |
| 7,651,731 | B2 | 1/2010 | Miranda |
| 7,682,556 | B2 | 3/2010 | Han et al. |
| 7,731,823 | B2 | 6/2010 | Nayar et al. |
| 7,744,729 | B2 | 6/2010 | Nayar et al. |
| 7,790,101 | B2 | 9/2010 | Kelly et al. |
| 7,802,613 | B2 | 9/2010 | Bullied et al. |
| 8,574,336 | B2 | 11/2013 | Rundquist et al. |
| 2002/0083740 | A1 | 7/2002 | Pandelisev |
| 2003/0234173 | A1 | 12/2003 | Minter |
| 2004/0190733 | A1 | 9/2004 | Nayar et al. |
| 2006/0024490 | A1 | 2/2006 | Werner et al. |
| 2006/0127577 | A1 | 6/2006 | Miranda et al. |
| 2006/0180293 | A1 | 8/2006 | Maehara |
| 2007/0235159 | A1 | 10/2007 | Han et al. |
| 2008/0011442 | A1 | 1/2008 | Pankl |
| 2008/0156147 | A1 | 7/2008 | Kelly et al. |
| 2008/0156453 | A1 | 7/2008 | Kelly et al. |
| 2008/0196550 | A1 | 8/2008 | Abe et al. |
| 2008/0250863 | A1 | 10/2008 | Moore |
| 2009/0068434 | A1 | 3/2009 | Michaluk |
| 2009/0224443 | A1 | 9/2009 | Rundquist et al. |
| 2009/0314390 | A1 | 12/2009 | Gigliotti, Jr. et al. |
| 2010/0264095 | A1 | 10/2010 | Hadfield et al. |
| 2011/0036467 | A1 | 2/2011 | Stebbing |
| 2011/0247456 | A1 | 10/2011 | Rundquist et al. |

FOREIGN PATENT DOCUMENTS

| | | |
|---|---|---|
| DE | 3905829 | 4/1990 |
| EP | 1 050 347 | 11/2000 |
| EP | 1 060 798 | 12/2000 |
| EP | 1 405 679 | 4/2004 |
| EP | 2 257 390 | 1/2012 |
| EP | 2 452 763 | 5/2012 |
| JP | 61-46368 | 3/1986 |
| JP | 1-127624 | 5/1989 |
| JP | 2-250745 | 10/1990 |
| JP | 4-110057 | 4/1996 |
| JP | 8-107899 | 4/1996 |
| JP | 1-1254095 | 9/1999 |
| JP | 05-318034 | 12/1999 |
| JP | 00-77486 | 9/2001 |
| JP | 03-181378 | 7/2003 |
| JP | 03-266378 | 9/2003 |
| JP | 2005-199253 | 7/2005 |
| JP | 2006-320945 | 11/2006 |
| WO | WO 86/06749 | 11/1986 |
| WO | WO 97/27005 | 1/1997 |
| WO | WO 00/44959 | 8/2000 |
| WO | WO 01/36695 | 5/2001 |
| WO | WO 2005/052207 A2 | 6/2005 |
| WO | WO 2009/111536 A2 | 9/2009 |
| WO | WO 2012/054478 A1 | 4/2012 |

OTHER PUBLICATIONS

Osawa et al., Paper entitled "Refining of Graphite Particles in Cast Irons by Applying Ultrasonic Vibration to Their Melts," National Research Institute for Metal, Japan, Processing and Fabrication of Advanced Materials VI, The Institute of Materials 1998, pp. 15-22.

Abramov, O. V., entitled "Ultrasound in Liquid and Solid Metals," Ultrasonics Research and Development, The Institute of General and Inorganic Chemistry, Russian Academy of Sciences, Moscow, Russia (1994), cover, index and pp. 30-34.

Notification for the Grant of Inventor Patent Right and the Notification for Completion of Formalities for Registration dated Nov. 5, 2012, 4 pages.

Shimada et al, entitled "A Kinetic Study on Oxidation of Niobium Carbide," 1993 Elsevier Science Publishers B.V., Solid State Ionics 63-65 (1993) pp. 312-317.

U.S Office (Advisory) Action dated Oct. 9, 2012 in U.S. Appl. No. 12/397,534, 4 pages.

U.S. Office Action dated Apr. 5, 2012 cited in U.S. Appl. No. 12/397,534.

European Search Report dated Apr. 13, 2012 cited in Application No. 11195036.6-2212.

U.S. Office Action dated Aug. 2, 2012 cited in U.S. Appl. No. 12/397,534.

Shimada et al., Article entitled "A Kinetic Study on Oxidation of Niobium Carbide," published in the 1993 Elsevier Science Publishers B.V., Solid State Ionics 63-65 (1993) pp. 312-317.

U.S. Appl. No. 13/082,437, filed Apr. 8, 2011 entitled "Ultrasonic Degassing of Molten Metals".

Metals Handbook, American Society of Metals, pp. 1-44 to 1-53, Sep. 1992.

Conduction: The Physic Hypertext book, 1998, pp. 1-3.

Partial International Search Report dated Jul. 8, 2009 cited in Application No. PCT/US2009/035983.

International Search Report dated Sep. 24, 2009 cited in Application No. PCT/US2009/035983.

European Communication dated Feb. 9, 2011 cited in Application No. 09 718 430.3-2213.

International Search Report dated Aug. 17, 2011 cited in Application No. PCT/US2011/031781.

U.S. Office Action dated Aug. 10, 2010 cited in U.S. Appl. No. 12/397,534.

(56) References Cited

OTHER PUBLICATIONS

U.S. Final Office Action dated Mar. 14, 2011 cited in U.S. Appl. No. 12/397,534.
U.S. Office Action dated Oct. 7, 2011 cited in U.S. Appl. No. 12/397,534.
Notice of Allowance dated Jun. 13, 2013 cited in U.S. Appl. No. 13/082,437, 7 pages.
U.S. Appl. No. 14/024,932, filed Sep. 12, 2013 entitled "Ultrasonic Degassing of Molten Metals".
International Search Report and the Written Opinion dated Aug. 30, 2013 cited in Application No. PCT/US2012/059529, 14 pages.
U.S. Office Action dated Feb. 28, 2013 in U.S. Appl. No. 13/082,437, 27 pages.
Chinese Office Action dated Sep. 13, 2013 in Chinese Application No. 201180028126.4 2 pages.

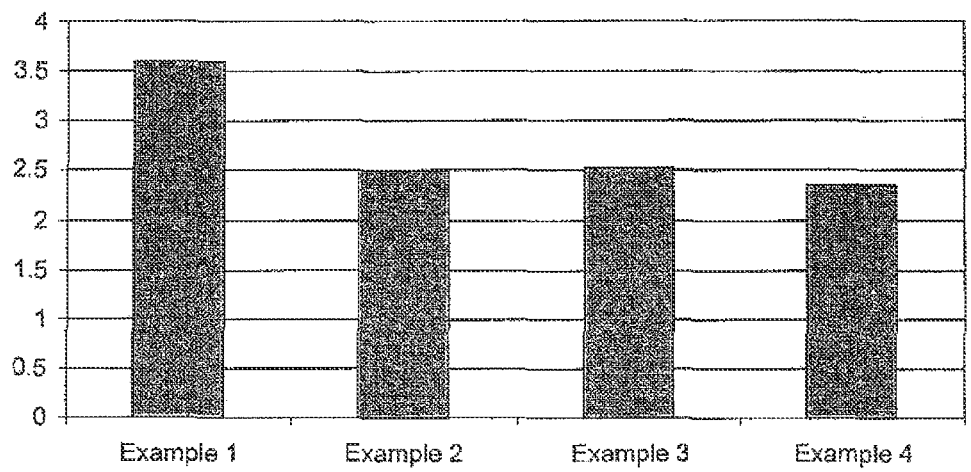
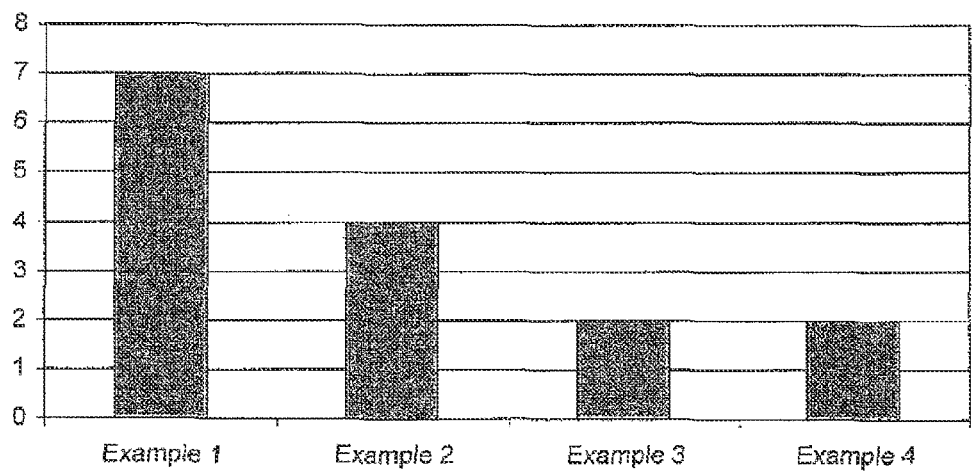

ULTRASONIC DEVICE WITH INTEGRATED GAS DELIVERY SYSTEM

REFERENCE TO RELATED APPLICATION

This application is a continuation-in-part application of U.S. patent application Ser. No. 13/082,437, filed on Apr. 8, 2011, now U.S. Pat. No. 8,574,336, which claims the benefit of U.S. Provisional Application No. 61/322,324, filed on Apr. 9, 2010, both of which are incorporated herein by reference in their entirety.

COPYRIGHTS

All rights, including copyrights, in the material included herein are vested in and the property of the Applicants. The Applicants retain and reserve all rights in the material included herein, and grant permission to reproduce the material only in connection with reproduction of the granted patent and for no other purpose.

BACKGROUND

The processing or casting of certain metal articles may require a bath containing a molten metal, and this bath of molten metal may be maintained at a temperature in a range of 700° C. to 1200° C., or more, depending upon the particular metal. Many instruments or devices may be used in the molten metal bath for the production or casting of the desired metal article. There is a need for these instruments or devices to better withstand the elevated temperatures encountered in the molten metal bath, beneficially having a longer lifetime and limited to no reactivity with the particular molten metal.

Moreover, molten metals may have one or more gasses dissolved in them and/or impurities present in them, and these gasses and/or impurities may negatively impact the final production and casting of the desired metal article, and/or the resulting physical properties of the metal article itself. Attempts to reduce the amounts of dissolved gasses or impurities present in molten metal baths have not been completely successful. Accordingly, there is a need for improved methods to remove gasses and/or impurities from molten metals.

SUMMARY

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The present invention is directed to methods for reducing the amount of a dissolved gas (and/or various impurities) in a molten metal bath (e.g., ultrasonic degassing). In one embodiment, the method may comprise operating an ultrasonic device in the molten metal bath, and introducing a purging gas into the molten metal bath in close proximity to the ultrasonic device. For example, the dissolved gas may comprise hydrogen, the molten metal bath may comprise aluminum or copper (including alloys thereof), and the purging gas may comprise argon and/or nitrogen. The purging gas may be added to the molten metal bath within about 50 cm (or 25 cm, or 15 cm, or 5 cm, or 2 cm), or through a tip, of the ultrasonic device. The purging gas may be added or introduced into the molten metal bath at a rate in a range from about 0.1 to about 150 L/min, or additionally or alternatively, at a rate in a range from about 10 to about 500 mL/hr of purging gas per kg/hr of output from the molten metal bath.

The present invention also discloses ultrasonic devices, and these ultrasonic devices may be used in many different applications, including ultrasonic degassing and grain refining. As an example, the ultrasonic device may comprise an ultrasonic transducer; a probe attached to the ultrasonic transducer, the probe comprising a tip; and a gas delivery system, the gas delivery system comprising a gas inlet, a gas flow path through the probe, and a gas outlet at the tip of the probe. In an embodiment, the probe may be an elongated probe comprising a first end and a second end, the first end attached to the ultrasonic transducer and the second end comprising a tip. Moreover, the probe may comprise stainless steel, titanium, niobium, a ceramic, and the like, or a combination of any of these materials. In another embodiment, the ultrasonic probe may be a unitary Sialon probe with the integrated gas delivery system therethrough. In yet another embodiment, the ultrasonic device may comprise multiple probe assemblies and/or multiple probes per ultrasonic transducer.

Both the foregoing summary and the following detailed description provide examples and are explanatory only. Accordingly, the foregoing summary and the following detailed description should not be considered to be restrictive. Further, features or variations may be provided in addition to those set forth herein. For example, certain embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings:

FIG. 5 is a bar graph illustrating the percentage difference in density for each of Examples 1-4 as compared to the theoretical density of aluminum.

FIG. 6 is a bar graph illustrating the hydrogen content in ppm of each of Examples 1-4.

DETAILED DESCRIPTION

Figure 1:
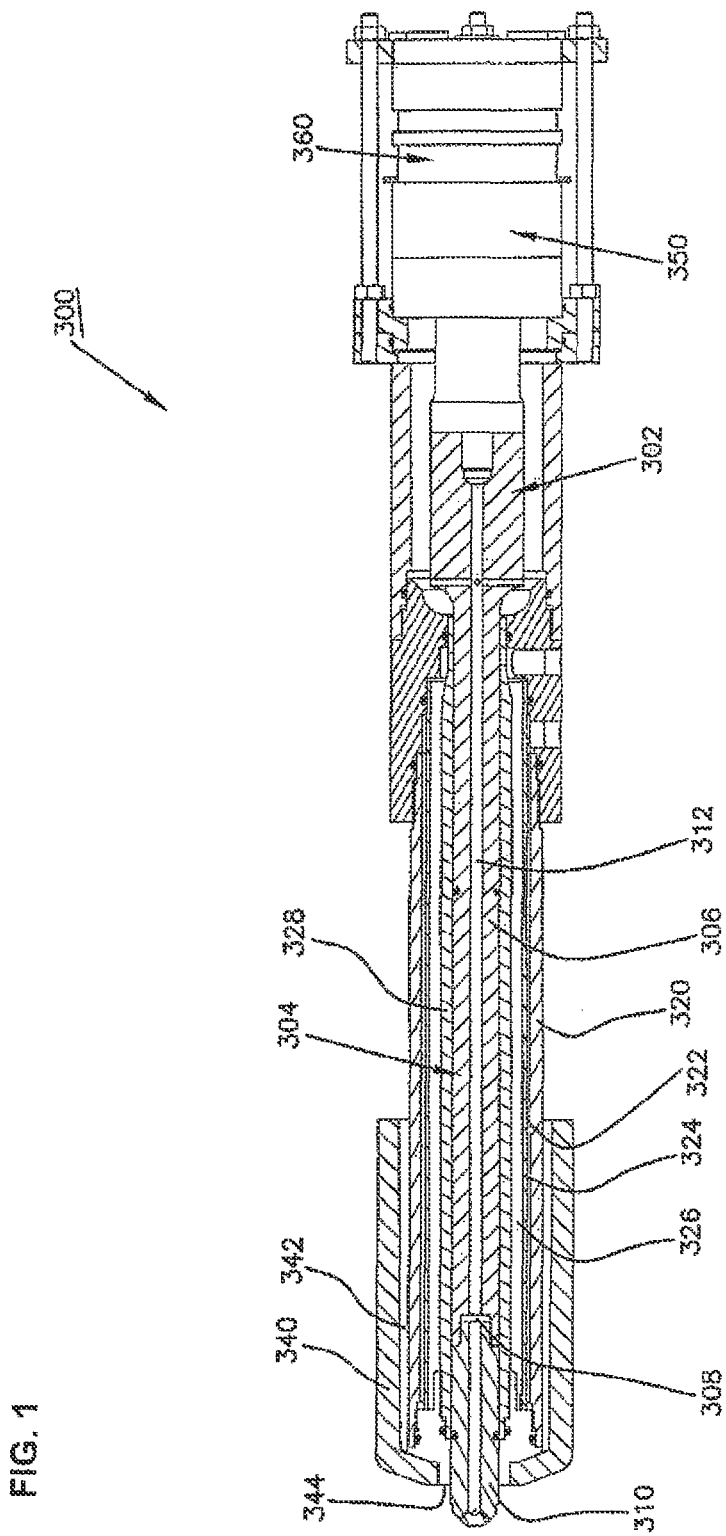
FIG. 1 shows a partial cross-sectional view of an ultrasonic device in an embodiment of the present invention.

The following detailed description refers to the accompanying drawings. Wherever possible, the same or similar reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the scope of the invention.

The terms "a," "an," and "the" are intended to include plural alternatives, e.g., at least one. For instance, the disclosure of "an ultrasonic device," "an elongated probe," "a purging gas," etc., is meant to encompass one, or combinations of more than one, ultrasonic device (e.g., one or two or more ultrasonic devices), elongated probe (e.g., one or two or more elongated probes), purging gas (e.g., one or two or more purging gasses), etc., unless otherwise specified.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

Applicants disclose several types of ranges in the present invention. When Applicants disclose or claim a range of any type, Applicants' intent is to disclose or claim individually each possible number that such a range could reasonably encompass, including end points of the range as well as any sub-ranges and combinations of sub-ranges encompassed therein. For example, in an embodiment of the invention, the purging gas may be added to the molten metal bath at a rate in a range from about 1 to about 50 L/min. By a disclosure that the flow rate is in a range from about 1 to about 50 L/min, Applicants intend to recite that the flow rate may be about 1, about 2, about 3, about 4, about 5, about 6, about 7, about 8, about 9, about 10, about 11, about 12, about 13, about 14, about 15, about 16, about 17, about 18, about 19, about 20, about 21, about 22, about 23, about 24, about 25, about 26, about 27, about 28, about 29, about 30, about 31, about 32, about 33, about 34, about 35, about 36, about 37, about 38, about 39, about 40, about 41, about 42, about 43, about 44, about 45, about 46, about 47, about 48, about 49, or about 50 L/min. Additionally, the flow rate may be within any range from about 1 to about 50 L/min (for example, the rate is in a range from about 2 to about 20 L/min), and this also includes any combination of ranges between about 1 and about 50 L/min. Likewise, all other ranges disclosed herein should be interpreted in a similar manner.

Embodiments of the present invention may provide systems, methods, and/or devices for the ultrasonic degassing of molten metals. Such molten metals may include, but are not limited to, aluminum, copper, steel, zinc, magnesium, and the like, or combinations of these and other metals (e.g., alloys). Accordingly, the present invention is not limited to any particular metal or metal alloy. The processing or casting of articles from a molten metal may require a bath containing the molten metal, and this bath of the molten metal may be maintained at elevated temperatures. For instance, molten copper may be maintained at temperatures of around 1100° C., while molten aluminum may be maintained at temperatures of around 750° C.

As used herein, the terms "bath," "molten metal bath," and the like are meant to encompass any container that might contain a molten metal, inclusive of vessel, crucible, trough, launder, furnace, ladle, and so forth. The bath and molten metal bath terms are used to encompass batch, continuous, semi-continuous, etc., operations and, for instance, where the molten metal is generally static (e.g., often associated with a crucible) and where the molten metal is generally in motion (e.g., often associated with a launder).

Many instruments or devices may be used to monitor, to test, or to modify the conditions of the molten metal in the bath, as well as for the final production or casting of the desired metal article. There is a need for these instruments or devices to better withstand the elevated temperatures encountered in molten metal baths, beneficially having a longer lifetime and limited to no reactivity with the molten metal, whether the metal is (or the metal comprises) aluminum, or copper, or steel, or zinc, or magnesium, and so forth.

Furthermore, molten metals may have one or more gasses dissolved in them, and these gasses may negatively impact the final production and casting of the desired metal article, and/or the resulting physical properties of the metal article itself. For instance, the gas dissolved in the molten metal may comprise hydrogen, oxygen, nitrogen, sulfur dioxide, and the like, or combinations thereof. In some circumstances, it may be advantageous to remove the gas, or to reduce the amount of the gas in the molten metal. As an example, dissolved hydrogen may be detrimental in the casting of aluminum (or copper, or other metal or alloy) and, therefore, the properties of finished articles produced from aluminum (or copper, or other metal or alloy) may be improved by reducing the amount of entrained hydrogen in the molten bath of aluminum (or copper, or other metal or alloy). Dissolved hydrogen over 0.2 ppm, over 0.3 ppm, or over 0.5 ppm, on a mass basis, may have detrimental effects on the casting rates and the quality of resulting aluminum (or copper, or other metal or alloy) rods and other articles. Hydrogen may enter the molten aluminum (or copper, or other metal or alloy) bath by its presence in the atmosphere above the bath containing the molten aluminum (or copper, or other metal or alloy), or it may be present in aluminum (or copper, or other metal or alloy) feedstock starting material used in the molten aluminum (or copper, or other metal or alloy) bath.

Attempts to reduce the amounts of dissolved gasses in molten metal baths have not been completely successful. Often, these processes involve additional and expensive equipment, as well as potentially hazardous materials. For instance, a process used in the metal casting industry to reduce the dissolved gas content of a molten metal may consist of rotors made of a material such as graphite, and these rotors may be placed within the molten metal bath. Chlorine gas additionally may be added to the molten metal bath at positions adjacent to the rotors within the molten metal bath. This process will be referred to as the "conventional" process throughout this disclosure, and is often referred to in the industry as rotary gas purging. While the conventional process may be successful in reducing, for example, the amount of dissolved hydrogen in a molten metal bath in some situations, this conventional process has noticeable drawbacks, not the least of which are cost, complexity, and the use of potentially hazardous and potentially environmentally harmful chlorine gas.

Additionally, molten metals may have impurities present in them, and these impurities may negatively impact the final production and casting of the desired metal article, and/or the resulting physical properties of the metal article itself. For instance, the impurity in the molten metal may comprise an alkali metal or other metal that is neither required nor desired to be present in the molten metal. As one of skill in the art would recognize, small percentages of certain metals are present in various metal alloys, and such metals would not be considered to be impurities. As non-limiting examples, impurities may comprise lithium, sodium, potassium, lead, and the like, or combinations thereof. Various impurities may enter a molten metal bath (aluminum, copper, or other metal or alloy) by their presence in the incoming metal feedstock starting material used in the molten metal bath.

Embodiments of this invention may provide methods for reducing an amount of a dissolved gas in a molten metal bath or, in alternative language, methods for degassing molten metals. One such method may comprise operating an ultrasonic device in the molten metal bath, and introducing a purging gas into the molten metal bath in close proximity to the ultrasonic device. The dissolved gas may be or may comprise oxygen, hydrogen, sulfur dioxide, and the like, or combinations thereof. For example, the dissolved gas may be or may comprise hydrogen. The molten metal bath may comprise aluminum, copper, zinc, steel, magnesium, and the like, or mixtures and/or combinations thereof (e.g., including various alloys of aluminum, copper, zinc, steel, magnesium, etc.). In some embodiments, the molten metal bath may comprise aluminum, while in other embodiments, the molten metal bath may comprise copper. Accordingly, the molten metal in the bath may be aluminum or, alternatively, the molten metal may be copper.

Moreover, embodiments of this invention may provide methods for reducing an amount of an impurity present in a molten metal bath or, in alternative language, methods for removing impurities. One such method may comprise operating an ultrasonic device in the molten metal bath, and introducing a purging gas into the molten metal bath in close proximity to the ultrasonic device. The impurity may be or may comprise lithium, sodium, potassium, lead, and the like, or combinations thereof. For example, the impurity may be or may comprise lithium or, alternatively, sodium. The molten metal bath may comprise aluminum, copper, zinc, steel, magnesium, and the like, or mixtures and/or combinations thereof (e.g., including various alloys of aluminum, copper, zinc, steel, magnesium, etc.). In some embodiments, the molten metal bath may comprise aluminum, while in other embodiments, the molten metal bath may comprise copper. Accordingly, the molten metal in the bath may be aluminum or, alternatively, the molten metal may be copper.

The purging gas employed in the methods of degassing and/or methods of removing impurities disclosed herein may comprise one or more of nitrogen, helium, neon, argon, krypton, and/or xenon, but is not limited thereto. It is contemplated that any suitable gas may be used as a purging gas, provided that the gas does not appreciably react with, or dissolve in, the specific metal(s) in the molten metal bath. Additionally, mixtures or combinations of gases may be employed. According to some embodiments disclosed herein, the purging gas may be or may comprise an inert gas; alternatively, the purging gas may be or may comprise a noble gas; alternatively, the purging gas may be or may comprise helium, neon, argon, or combinations thereof; alternatively, the purging gas may be or may comprise helium; alternatively, the purging gas may be or may comprise neon; or alternatively, the purging gas may be or may comprise argon. Additionally, Applicants contemplate that, in some embodiments, the conventional degassing technique can be used in conjunction with ultrasonic degassing processes disclosed herein. Accordingly, the purging gas may further comprise chlorine gas in some embodiments, such as the use of chlorine gas as the purging gas alone or in combination with at least one of nitrogen, helium, neon, argon, krypton, and/or xenon.

However, in other embodiments of this invention, methods for degassing or for reducing an amount of a dissolved gas in a molten metal bath may be conducted in the substantial absence of chlorine gas, or with no chlorine gas present. As used herein, a substantial absence means that no more than 5% chlorine gas by weight may be used, based on the amount of purging gas used. In some embodiments, the methods disclosed herein may comprise introducing a purging gas, and this purging gas may be selected from the group consisting of nitrogen, helium, neon, argon, krypton, xenon, and combinations thereof.

The amount of the purging gas introduced into the bath of molten metal may vary depending on a number of factors. Often, the amount of the purging gas introduced in a method of degassing molten metals (and/or in a method of removing impurities from molten metals) in accordance with embodiments of this invention may fall within a range from about 0.1 to about 150 standard liters/min (L/min). In some embodiments, the amount of the purging gas introduced may be in a range from about 0.5 to about 100 L/min, from about 1 to about 100 L/min, from about 1 to about 50 L/min, from about 1 to about 35 L/min, from about 1 to about 25 L/min, from about 1 to about 10 L/min, from about 1.5 to about 20 L/min, from about 2 to about 15 L/min, or from about 2 to about 10 L/min. These volumetric flow rates are in standard liters per minute, i.e., at a standard temperature (21.1° C.) and pressure (101 kPa).

In continuous or semi-continuous molten metal operations, the amount of the purging gas introduced into the bath of molten metal may vary based on the molten metal output or production rate. Accordingly, the amount of the purging gas introduced in a method of degassing molten metals (and/or in a method of removing impurities from molten metals) in accordance with such embodiments may fall within a range from about 10 to about 500 mL/hr of purging gas per kg of molten metal (mL purging gas/kg molten metal). In some embodiments, the ratio of the volumetric flow rate of the purging gas to the output rate of the molten metal may be in a range from about 10 to about 400 mL/kg; alternatively, from about 15 to about 300 mL/kg; alternatively, from about 20 to about 250 mL/kg; alternatively, from about 30 to about 200 mL/kg; alternatively, from about 40 to about 150 mL/kg; or alternatively, from about 50 to about 125 mL/kg. As above, the volumetric flow rate of the purging gas is at a standard temperature (21.1° C.) and pressure (101 kPa).

Methods for degassing molten metals consistent with embodiments of this invention may be effective in removing greater than about 10 weight percent of the dissolved gas present in the molten metal bath, i.e., the amount of dissolved gas in the molten metal bath may be reduced by greater than about 10 weight percent from the amount of dissolved gas present before the degassing process was employed. In some embodiments, the amount of dissolved gas present may be reduced by greater than about 15 weight percent, greater than about 20 weight percent, greater than about 25 weight percent, greater than about 35 weight percent, greater than about 50 weight percent, greater than about 75 weight percent, or greater than about 80 weight percent, from the amount of dissolved gas present before the degassing method was employed. For instance, if the dissolved gas is hydrogen, levels of hydrogen in a molten bath containing aluminum or copper greater than about 0.3 ppm or 0.4 ppm or 0.5 ppm (on a mass basis) may be detrimental and, often, the hydrogen content in the molten metal may be about 0.4 ppm, about 0.5 ppm, about 0.6 ppm, about 0.7 ppm, about 0.8 ppm, about 0.9 ppm, about 1 ppm, about 1.5 ppm, about 2 ppm, or greater than 2 ppm. It is contemplated that employing the methods disclosed in embodiments of this invention may reduce the amount of the dissolved gas in the molten metal bath to less than about 0.4 ppm; alternatively, to less than about 0.3 ppm; alternatively, to less than about 0.2 ppm; alternatively, to within a range from about 0.1 to about 0.4 ppm; alternatively, to within a range from about 0.1 to about 0.3 ppm; or alternatively, to within a range from about 0.2 to about 0.3 ppm. In these and other embodiments, the dissolved gas may be or may comprise hydrogen, and the molten metal bath may be or may comprise aluminum and/or copper.

Embodiments of this invention directed to methods of degassing (e.g., reducing the amount of a dissolved gas in bath comprising a molten metal) or to methods of removing impurities may comprise operating an ultrasonic device in the molten metal bath. The ultrasonic device may comprise an ultrasonic transducer and an elongated probe, and the probe may comprise a first end and a second end. The first end may be attached to the ultrasonic transducer and the second end may comprise a tip, and the tip of the elongated probe may comprise niobium. Specifics on illustrative and non-limiting examples of ultrasonic devices that may be employed in the processes and methods disclosed herein will be discussed further below. As it pertains to an ultrasonic degassing process or to a process for removing impurities, the purging gas may be introduced into the molten metal bath, for instance, at a location near the ultrasonic device. Often, the purging gas may be introduced into the molten metal bath at a location near the tip of the ultrasonic device. It is contemplated that the purging gas may be introduced into the molten metal bath within about 1 meter of the tip of the ultrasonic device, such as, for example, within about 100 cm, within about 50 cm, within about 40 cm, within about 30 cm, within about 25 cm, or within about 20 cm, of the tip of the ultrasonic device. In some embodiments, the purging gas may be introduced into the molten metal bath within about 15 cm of the tip of the ultrasonic device; alternatively, within about 10 cm; alternatively, within about 8 cm; alternatively, within about 5 cm; alternatively, within about 3 cm; alternatively, within about 2 cm; or alternatively, within about 1 cm. In a particular embodiment, the purging gas may be introduced into the molten metal bath adjacent to or through the tip of the ultrasonic device.

While not intending to be bound by this theory, Applicants believe that a synergistic effect may exist between the use of an ultrasonic device and the incorporation of a purging gas in close proximity, resulting in a dramatic reduction in the amount of a dissolved gas in a bath containing molten metal. Applicants believe that the ultrasonic energy produced by the ultrasonic device may create cavitation bubbles in the melt, into which the dissolved gas may diffuse. However, Applicants believe that, in the absence of the purging gas, many of the cavitation bubbles may collapse prior to reaching the surface of the bath of molten metal. Applicants believe that the purging gas may lessen the amount of cavitation bubbles that collapse before reaching the surface, and/or may increase the size of the bubbles containing the dissolved gas, and/or may increase the number of bubbles in the molten metal bath, and/or may increase the rate of transport of bubbles containing dissolved gas to the surface of the molten metal bath. Regardless of the actual mechanism, Applicants believe that the use of an ultrasonic device in combination with a source of a purging gas in close proximity may provide a synergistic improvement in the removal of the dissolved gas from the molten metal bath, and a synergistic reduction in the amount of dissolved gas in the molten metal. Again, while not wishing to be bound by theory, Applicants believe that the ultrasonic device may create cavitation bubbles within close proximity to the tip of the ultrasonic device. For instance, for an ultrasonic device having a tip with a diameter of about 2 to 5 cm, the cavitation bubbles may be within about 15 cm, about 10 cm, about 5 cm, about 2 cm, or about 1 cm of the tip of the ultrasonic device before collapsing. If the purging gas is added at a distance that is too far from the tip of the ultrasonic device, the purging gas may not be able to diffuse into the cavitation bubbles. Hence, while not being bound by theory, Applicants believe that it may be beneficial for the purging gas to be introduced into the molten metal bath within about 25 cm or about 20 cm of the tip of the ultrasonic device, and more beneficially, within about 15 cm, within about 10 cm, within about 5 cm, within about 2 cm, or within about 1 cm, of the tip of the ultrasonic device.

Ultrasonic devices in accordance with embodiments of this invention may be in contact with molten metals such as aluminum or copper, for example, as disclosed in U.S. Patent Publication No. 2009/0224443, which is incorporated herein by reference in its entirety. In an ultrasonic device for reducing dissolved gas content (e.g., hydrogen) in a molten metal, niobium or an alloy thereof may be used as a protective barrier for the device when it is exposed to the molten metal, or as a component of the device with direct exposure to the molten metal.

Embodiments of the present invention may provide systems and methods for increasing the life of components directly in contact with molten metals. For example, embodiments of the invention may use niobium to reduce degradation of materials in contact with molten metals, resulting in significant quality improvements in end products. In other words, embodiments of the invention may increase the life of or preserve materials or components in contact with molten metals by using niobium as a protective barrier. Niobium may have properties, for example its high melting point, that may help provide the aforementioned embodiments of the invention. In addition, niobium also may form a protective oxide barrier when exposed to temperatures of about 200° C. and above.

Moreover, embodiments of the invention may provide systems and methods for increasing the life of components directly in contact or interfacing with molten metals. Because niobium has low reactivity with certain molten metals, using niobium may prevent a substrate material from degrading. Consequently, embodiments of the invention may use niobium to reduce degradation of substrate materials resulting in significant quality improvements in end products. Accordingly, niobium in association with molten metals may combine niobium's high melting point and its low reactivity with molten metals, such as aluminum and/or copper.

In some embodiments, niobium or an alloy thereof may be used in an ultrasonic device comprising an ultrasonic transducer and an elongated probe. The elongated probe may comprise a first end and a second end, wherein the first end may be attached to the ultrasonic transducer and the second end may comprise a tip. In accordance with this embodiment, the tip of the elongated probe may comprise niobium (e.g., niobium or an alloy thereof). The ultrasonic device may be used in an ultrasonic degassing process, as discussed above. The ultrasonic transducer may generate ultrasonic waves, and the probe attached to the transducer may transmit the ultrasonic waves into a bath comprising a molten metal, such as aluminum, copper, zinc, steel, magnesium, and the like, or mixtures and/or combinations thereof (e.g., including various alloys of aluminum, copper, zinc, steel, magnesium, etc.).

FIG. 1 illustrates using niobium and other materials in an ultrasonic device 300, which may be used to reduce dissolved gas content in a molten metal. The ultrasonic device 300 may include an ultrasonic transducer 360, a booster 350 for increased output, and an ultrasonic probe assembly 302 attached to the transducer 360. The ultrasonic probe assembly 302 may comprise an elongated ultrasonic probe 304 and an ultrasonic medium 312. The ultrasonic device 300 and ultrasonic probe 304 may be generally cylindrical in shape, but this is not a requirement. The ultrasonic probe 304 may comprise a first end and a second end, wherein the first end comprises an ultrasonic probe shaft 306 which is attached to the ultrasonic transducer 360. The ultrasonic probe 304 and the ultrasonic probe shaft 306 may be constructed of various materials. Exemplary materials may include, but are not limited to, stainless steel, titanium, niobium, a ceramic (e.g., a Sialon, a Silicon carbide, a Boron carbide, a Boron nitride, a Silicon nitride, an Aluminum nitride, an Aluminum oxide, a Zirconia, etc.) and the like, or combinations thereof. The second end of the ultrasonic probe 304 may comprise an ultrasonic probe tip 310. The ultrasonic probe tip 310 may comprise niobium. Alternatively, the tip 310 may consistent essentially of, or consist of, niobium. Niobium may be alloyed with one or more other metals, or niobium may be a layer that is plated or coated onto a base layer of another material. For instance, the tip 310 may comprise an inner layer and an outer layer, wherein the inner layer may comprise a ceramic or a metal material (e.g., titanium) and the outer layer may comprise niobium. In this embodiment, the thickness of the outer layer comprising niobium may be less than about 25 microns, or less than about 10 microns, or alternatively, within a range from about 2 to about 8 microns. For example, the thickness of the outer layer comprising niobium may be in range from about 3 to about 6 microns.

The ultrasonic probe shaft 306 and the ultrasonic probe tip 310 may be joined by a connector 308. The connector 308 may represent a means for attaching the shaft 306 and the tip 310. For example the shaft 306 and the tip 310 may be bolted or soldered together. In one embodiment, the connector 308 may represent that the shaft 306 contains recessed threading and the tip 310 may be screwed into the shaft 306. It is contemplated that the ultrasonic probe shaft 306 and the ultrasonic probe tip 310 may comprise different materials. For instance, the ultrasonic probe shaft 306 may be or may comprise titanium and/or niobium, while the ultrasonic probe tip 310 may be or may comprise niobium. Alternatively, the ultrasonic probe shaft 306 may be or may comprise titanium and/or a ceramic (e.g., a Sialon, a Silicon carbide, a Boron carbide, a Boron nitride, a Silicon nitride, an Aluminum nitride, an Aluminum oxide, a Zirconia, etc.), while the ultrasonic probe tip 310 may be or may comprise a ceramic (e.g., a Sialon, a Silicon carbide, a Boron carbide, a Boron nitride, a Silicon nitride, an Aluminum nitride, an Aluminum oxide, a Zirconia, etc.).

In other embodiments, the ultrasonic probe 304 may be a single piece, e.g., the ultrasonic probe shaft 306 and the ultrasonic probe tip 310 are a unitary part having the same construction. In such instances, the ultrasonic probe may comprise, for instance, niobium or an alloy thereof, a ceramic (e.g., a Sialon, a Silicon carbide, a Boron carbide, a Boron nitride, a Silicon nitride, an Aluminum nitride, an Aluminum oxide, a Zirconia, etc.), or other suitable material.

Referring again to FIG. 1, the ultrasonic device 300 may comprise an inner tube 328, a center tube 324, an outer tube 320, and a protection tube 340. These tubes or channels may surround at least a portion of the ultrasonic probe 304 and generally may be constructed of any suitable metal or ceramic material. It may be expected that the ultrasonic probe tip 310 will be placed into the bath of molten metal; however, it is contemplated that a portion of the protection tube 340 also may be immersed in molten metal. Accordingly, the protection tube 340 may be or may comprise titanium, niobium, a ceramic (e.g., a Sialon, a Silicon carbide, a Boron carbide, a Boron nitride, a Silicon nitride, an Aluminum nitride, an Aluminum oxide, a Zirconia, etc.), or a combination of more than one of these materials. Contained within the tubes 328, 324, 320, and 340 may be fluids 322, 326, and 342, as illustrated in FIG. 1. The fluid may be a liquid or a gas (e.g., argon), the purpose of which may be to provide cooling to the ultrasonic device 300 and, in particular, to the ultrasonic probe tip 310 and the protection tube 340.

The ultrasonic device 300 may comprise an end cap 344. The end cap may bridge the gap between the protection tube 340 and the probe tip 310 and may reduce or prevent molten metal from entering the ultrasonic device 300. Similar to the protection tube 340, the end cap 344 may be or may comprise, for example, titanium, niobium, a ceramic (e.g., a Sialon, a Silicon carbide, a Boron carbide, a Boron nitride, a Silicon nitride, an Aluminum nitride, an Aluminum oxide, a Zirconia, etc.), or a combination of more than one of these materials.

The ultrasonic probe tip 310, the protection tube 340, or the end cap 344, or all three, may comprise niobium. Niobium alone may be used, niobium may be alloyed with one or more other metals, or niobium may be a layer that is plated or coated onto a base layer of another material. For instance, the ultrasonic probe tip 310, the protection tube 340, or the end cap 344, or all three, may comprise an inner layer and an outer layer, wherein the inner layer may comprise a ceramic or a metal material and the outer layer may comprise niobium. It may be expected that the presence of niobium on parts of the ultrasonic device may improve the life of the device, may provide low or no chemical reactivity when in contact with molten metals, may provide strength at the melting temperature of the molten metal, and may have the capability to propagate ultrasonic waves. In accordance with some embodiments of this invention, when the tip 310 of the ultrasonic device does not comprise niobium, the tip may show erosion or degradation after only about 15-30 minutes in a molten metal bath (e.g., of aluminum or copper). In contrast, when the tip of the ultrasonic device comprises niobium, the tip may show no or minimal erosion or degradation after at least 1 hour or more, for instance, no erosion or degradation after at least 2 hours, after at least 3 hours, after at least 4 hours, after at least 5 hours, after at least 6 hours, after at least 12 hours, after at least 24 hours, after at least 48 hours, or after at least 72 hours.

In another embodiment, the ultrasonic probe tip 310, the protection tube 340, or the end cap 344, or all three, may comprise a ceramic, such as a Sialon, a Silicon carbide, a Boron carbide, a Boron nitride, a Silicon nitride, an Aluminum nitride, an Aluminum oxide, and/or a Zirconia, and the like. Further, the ultrasonic probe shaft 306 may comprise a ceramic, or alternatively, titanium.

Figure 2:
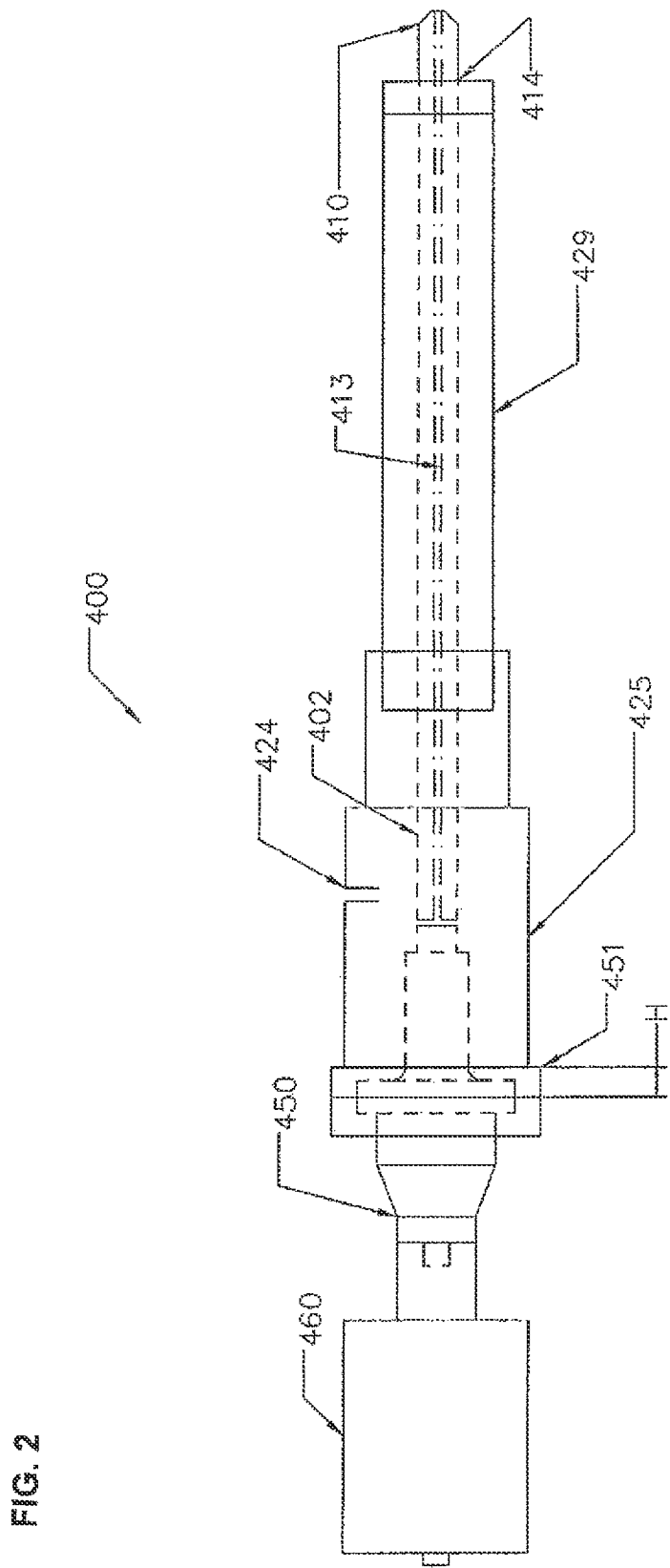
FIG. 2 shows a partial cross-sectional view of an ultrasonic device in another embodiment of the present invention.

FIG. 2 illustrates another ultrasonic device 400 that may comprise niobium, a ceramic such as a Sialon, a Silicon carbide, a Boron carbide, a Boron nitride, a Silicon nitride, an Aluminum nitride, an Aluminum oxide, and/or a Zirconia, or other suitable material. The ultrasonic device 400 may include an ultrasonic transducer 460, a booster 450 for increased output, and an ultrasonic probe assembly 402 attached to the transducer 460. The booster 450 may permit increased output at boost levels greater than about 1:1, for instance, from about 1.2:1 to about 10:1, or from about 1.4:1 to about 5:1. A booster clamp assembly 451 having a height H may be employed, where the height H may vary as needed to accommodate different length ultrasonic probes. The ultrasonic probe assembly 402 may comprise an elongated ultrasonic probe as depicted in FIG. 1 and an ultrasonic probe tip 410. The ultrasonic probe and tip may be constructed of various materials, as previously discussed, including, but not limited to, stainless steel, titanium, niobium, ceramics, and the like, or combinations thereof, inclusive of mixtures thereof, alloys thereof, and coatings thereof.

The ultrasonic device 400 may comprise a means for introducing a purging gas (e.g., into a molten metal bath) at a location near the ultrasonic device 400. It is contemplated that an external purging gas injection system (not shown) may be positioned in the molten metal bath, and the injection site may be near the ultrasonic device of FIG. 1 and/or FIG. 2. Alternatively, the ultrasonic device may comprise a purging gas outlet, such that the purging gas may be expelled near or at the tip of the ultrasonic device. For instance, the purging gas may be expelled through the end cap of the ultrasonic device and/or through the probe of the ultrasonic device. Referring again to FIG. 2, the ultrasonic device may comprise a purging gas inlet port 424 and injection chamber 425, connected to a purging gas delivery channel 413. The purging gas may be delivered to, and expelled through, a purging gas delivery space 414 located near or at the tip 410 of the ultrasonic device 400. It is contemplated that the purging gas delivery space 414, or purging gas outlet, may be within about 10 cm of the tip 410 of the ultrasonic device 400, such as, for example, within about 5 cm, within about 3 cm, within about 2 cm, within about 1.5 cm, within about 1 cm, or within about 0.5 cm, of the tip of the ultrasonic device.

Additionally, the ultrasonic device 400 may comprise an ultrasonic cooler system 429, which may be designed to keep the ultrasonic tip and/or the ultrasonic probe and/or the ultrasonic probe assembly at a temperature closer to room temperature (e.g., the temperature may be in a range from about 15° C. to about 75° C., or from about 20° C. to about 35° C.), as opposed to the elevated temperatures of molten metal experienced by the outer surface of the tip 410 of the ultrasonic device. It is contemplated that an ultrasonic cooler system may not be required if the ultrasonic probe and assembly comprise niobium, a ceramic such as a Sialon, a Silicon carbide, a Boron carbide, a Boron nitride, a Silicon nitride, an Aluminum nitride, an Aluminum oxide, and/or a Zirconia, or other suitable material. The ultrasonic cooler system 429 of FIG. 2 may be similar to that system depicted in FIG. 1 including, for instance, an inner tube 328, a center tube 324, an outer tube 320, a protection tube 340, and fluids 322, 326, and 342, designed to provide cooling and/or temperature control to the ultrasonic device. The fluid may be a liquid or a gas, and it is contemplated that the fluid may be the same material as the purging gas.

Figure 3:
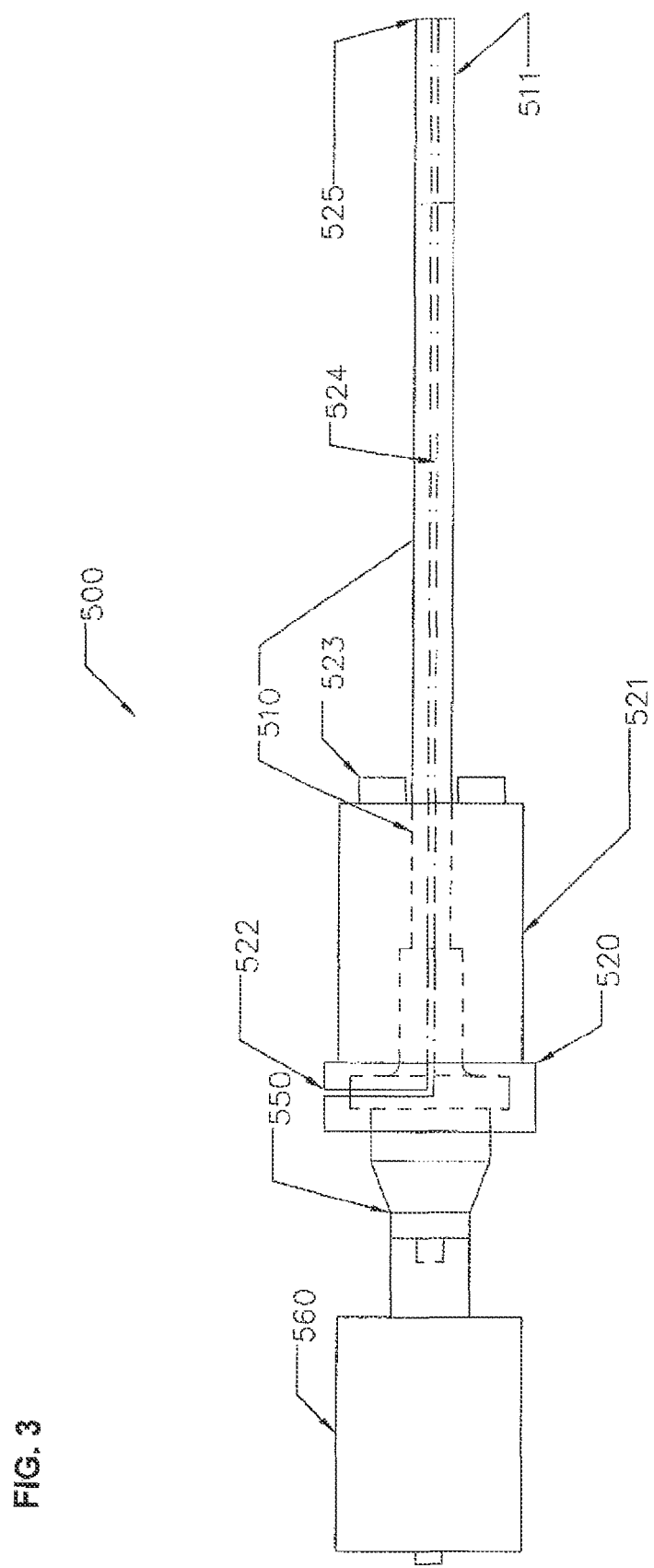
FIG. 3 shows a partial cross-sectional view of an ultrasonic device in another embodiment of the present invention.

FIG. 3 illustrates yet another ultrasonic device 500 that may comprise niobium, a ceramic such as a Sialon, a Silicon carbide, a Boron carbide, a Boron nitride, a Silicon nitride, an Aluminum nitride, an Aluminum oxide, and/or a Zirconia, or other suitable material. The ultrasonic device 500 may include an ultrasonic transducer 560, a booster 550 for increased output, and an ultrasonic probe assembly 510 attached to the transducer 560. The booster 550 may permit increased output at boost levels greater than about 1:1, for instance, from about 1.2:1 to about 10:1, or from about 1.4:1 to about 5:1. The ultrasonic probe 510 may be a single piece, or the ultrasonic probe 510 may comprise an ultrasonic probe shaft and an optional (and replaceable) ultrasonic probe tip 511, similar to that depicted in FIG. 1. The ultrasonic probe and tip may be constructed of various materials, as previously discussed, including, but not limited to, stainless steel, titanium, niobium, ceramics, and the like, or combinations thereof, inclusive of mixtures thereof, alloys thereof, and coatings thereof.

The ultrasonic device 500 may comprise a means for introducing a purging gas (e.g., into a molten metal bath) at a location near the ultrasonic device 500 and/or near the ultrasonic probe tip 511. As above, it is contemplated that an external purging gas injection system (not shown) may be positioned in the molten metal bath, and the injection site may be near the ultrasonic device of FIG. 3. Alternatively, the ultrasonic device may comprise a purging gas outlet, such that the purging gas may be expelled near or at the tip of the ultrasonic device. For instance, the purging gas may be expelled through the probe/tip of the ultrasonic device. Referring again to FIG. 3, the ultrasonic device may comprise a purging gas inlet port 522 in a chamber with the booster 550, an upper housing 520, lower support housing 521, and a lower support housing cover 523. The upper housing 520 may be gas tight and/or leak proof. The purging gas inlet port 522 may be connected to a purging gas delivery channel 524, which may be contained within the ultrasonic probe 510. The purging gas may be delivered to, and expelled through, a purging gas injection point 525 (or purging gas outlet port) located at the tip 511 of the ultrasonic device 500. Accordingly, in this embodiment, the ultrasonic device 500 may comprise an ultrasonic probe 510 comprising a purging gas injection system with a purging gas injection point at the tip of the ultrasonic probe.

Optionally, the ultrasonic device 500 may comprise an ultrasonic cooler system, such as described above relative to FIG. 1 and/or FIG. 2, but this is not a requirement.

Figure 4:
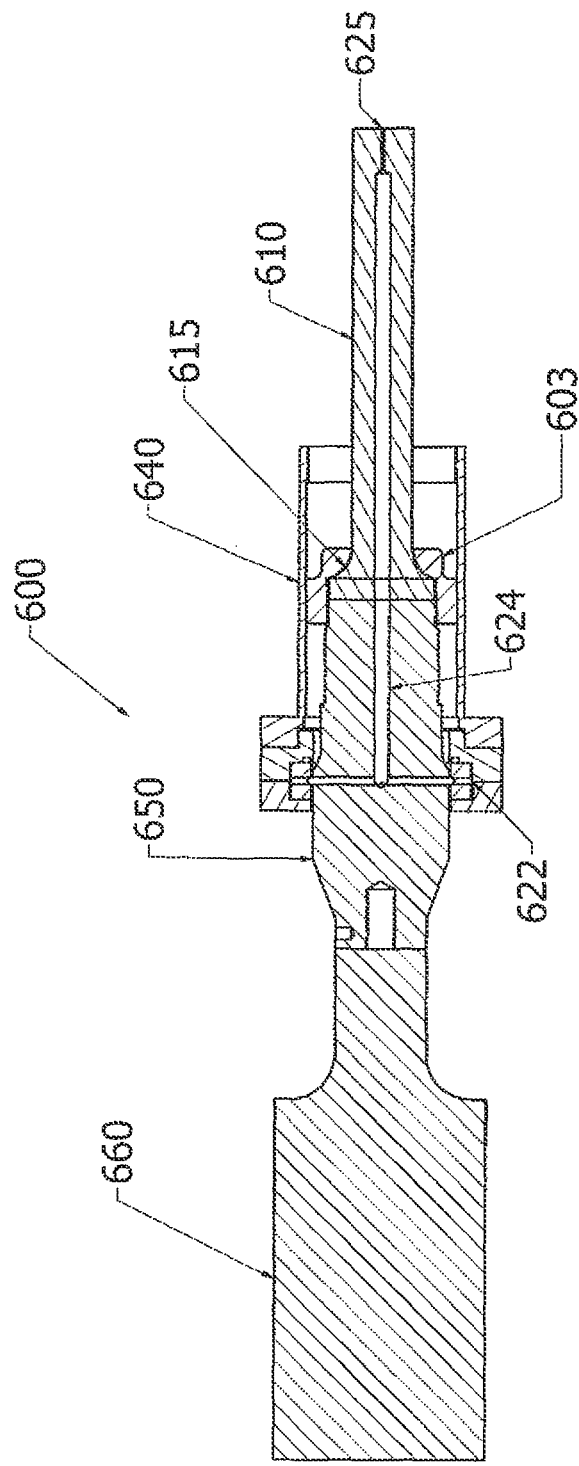
FIG. 4 shows a partial cross-sectional view of an ultrasonic device in another embodiment of the present invention.

Another ultrasonic device is illustrated in FIG. 4. The ultrasonic device 600 may include an ultrasonic transducer 660, a booster 650 for increased output, and an ultrasonic probe 610 attached to the transducer 660 and booster 650. The booster 650 may be in communication with the transducer 660, and may permit increased output at boost levels greater than about 1:1, for instance, from about 1.2:1 to about 10:1, or from about 1.4:1 to about 5:1. In some embodiments, the booster may be or may comprise a metal, such as titanium. The ultrasonic probe 610 may be a single piece, or the ultrasonic probe 610 may comprise an ultrasonic probe shaft and an optional (and replaceable) ultrasonic probe tip, similar to that depicted in FIG. 1. The ultrasonic probe 610 is not limited in shape and design to an elongated probe (e.g., generally cylindrical) with one end attached to the transducer 660 and/or booster 650, and the other end comprising a tip of the probe. In one embodiment, the probe may be generally cylindrical, however, a middle portion of the probe may be secured to the transducer/booster with a clamp or other attachment mechanism, such that probe has two tips, neither of which is attached directly to the transducer/booster. Yet, in another embodiment, the probe may be another geometric shape, such as spherical, or cylindrical with a spherical portion at the tip, etc.

The ultrasonic probe 610 may be constructed of various materials, as previously discussed, including, but not limited to, stainless steel, titanium, niobium, ceramics, and the like, or combinations thereof, inclusive of mixtures thereof, alloys thereof, and coatings thereof. In certain embodiments, the ultrasonic probe 610 may be or may comprise a ceramic material. For instance, the ultrasonic probe may be or may comprise a Sialon, a Silicon carbide, a Boron carbide, a Boron nitride, a Silicon nitride, an Aluminum nitride, an Aluminum oxide, a Zirconia, or a combination thereof; alternatively, a Sialon; alternatively, a Silicon carbide; alternatively, a Boron carbide; alternatively, a Boron nitride; alternatively, a Silicon nitride; alternatively, an Aluminum nitride; alternatively, an Aluminum oxide; or alternatively, a Zirconia. In some embodiments, the ultrasonic probe 610 may be a single piece, e.g., the probe is a unitary part, having the same construction or composition from the end attached to the transducer/booster to the probe tip.

Typical Sialons that may be used in embodiments disclosed herein are ceramic alloys containing the elements silicon (Si), aluminum (Al), oxygen (O) and nitrogen (N). Moreover, as would be recognized by one of skill in the art, there are α-Sialon and β-Sialon grades. The ultrasonic probe 610 may comprise a Sialon, and further, at least 20% (by weight) of which may be a-Sialon (or β-Sialon). While not wishing to be bound by theory, Applicants believe that the use of at least 20% (by weight), or 30% (by weight), or a weight percent in a range from about 20% to about 50%, of a β-Sialon may provide a stronger and more durable ultrasonic probe (e.g., less prone to breakage).

The ultrasonic device 600 may comprise a means for introducing a gas (e.g., a purging gas into a molten metal bath) at a location near the ultrasonic device 600 and/or near the ultrasonic probe tip. As above, it is contemplated that an external purging gas injection system (not shown) may be positioned in the molten metal bath, and the injection site may be near the ultrasonic device of FIG. 4. Alternatively, the ultrasonic device may comprise a gas delivery system, such that a gas may be expelled near or at the tip of the ultrasonic device. For instance, the gas may be expelled through the probe/tip of the ultrasonic device. Referring again to FIG. 4, the ultrasonic device 600 may comprise a gas inlet port 622 in a chamber in the booster 650. The gas inlet port 622 may be connected to a gas delivery channel 624, which may extend from the booster 650 to the tip of the ultrasonic probe 610. The gas inlet port 622 and part of the booster 650 may be contained within a gas tight and/or leak proof housing. The gas may be delivered to, and expelled through, a gas injection point 625 (or gas outlet) located at the tip of the ultrasonic probe 610. Accordingly, in this embodiment, the ultrasonic device 600 may comprise an ultrasonic probe 610 comprising a gas delivery system with a gas injection point at the tip of the ultrasonic probe.

The gas delivery channel 624 is shown in FIG. 4 as having a larger flow path in the booster 650 and a portion of the ultrasonic probe 610 closest to the booster, and a smaller flow path at the gas injection point 625, although this is not a requirement. For instance, the size of the gas delivery channel 624 can be substantially the same size (e.g., within +/−10-20%) from the gas inlet port 622 to the gas injection point 625 at the tip of the ultrasonic probe 610.

While not wishing to be bound by theory, Applicants believe that a smaller flow path (e.g., cross-sectional area) at the gas injection point, relative to the cross-sectional area of the ultrasonic probe, may result in superior degassing due to the higher velocity of the gas as it exits the probe. In some embodiments, the ratio of the cross-sectional area of the ultrasonic probe to the cross-sectional area of the gas delivery channel (i.e., at the gas injection point or gas outlet) may be in a range from about 30:1 to about 1000:1, from about 60:1 to about 1000:1, or from about 60:1 to about 750:1. In other embodiments, the ratio of the cross-sectional area of the ultrasonic probe to the cross-sectional area of the gas delivery channel (i.e., at the gas injection point or gas outlet) may be in a range from about 60:1 to about 700:1, from about 100:1 to about 700:1, or from about 200:1 to about 1000:1. In these and other embodiments, the length to diameter ratio (L/D) of the ultrasonic probe (e.g., a unitary elongated probe) may be in a range from about 5:1 to about 25:1, from about 5:1 to about 12:1, from about 7:1 to about 22:1, from about 10:1 to about 20:1, or from about 11:1 to about 18:1.

In embodiments directed to ultrasonic probes containing a ceramic material, such as a Sialon, it may be beneficial to employ an attachment nut 603 as a means for securing the ultrasonic probe 610 to the booster 650 and transducer 660. The attachment nut 603 may offer superior durability and longevity as compared to shrink-fit ceramic attachments. The attachment nut 603 may be constructed of various materials, such as, for instance, titanium, stainless steel, etc., and may contain fine pitch (internal) treads for robust securement, alleviating the need to have a threaded ceramic probe which is more prone to breakage. Moreover, the booster 650 may have external threads, onto which the attachment nut 603 (and, therefore, the probe 610) may be robustly secured. Generally, it also may be beneficial to keep the size and/or weight of the attachment nut as low as is mechanically feasible, such that ultrasonic vibrational properties of the probe are not adversely affected.

In certain embodiments, the probe 610 may have a large radius of curvature 615 at the attachment side of the probe. While not wishing to be bound by theory, Applicants believe that a smaller radius of curvature at the attachment side of the probe (e.g., proximate to the attachment nut) may lead to increased breakage of the probe, particularly at higher ultrasonic powers and/or amplitudes that may required for increased cavitation and superior dissolved gas removal in a degassing process. In particular embodiments contemplated herein, the radius of curvature 615 may be at least about ½", at least about ⅝", at least about ¾", at least about 1", and so forth. Such radiuses of curvature may be desirable regardless of the actual size of the probe (e.g., various probe diameters).

Optionally, the ultrasonic device 600 may comprise an ultrasonic cooler system, such as described above relative to FIG. 1 and/or FIG. 2, but this is not a requirement. Referring again to FIG. 4, the ultrasonic device 600, alternatively, may optionally comprise a thermal protection housing 640. This housing generally may be constructed of any suitable metal and/or ceramic material. It may be expected that the ultrasonic probe 610 will be placed into the bath of molten metal; therefore, the thermal protection housing may be used to shield a portion of the booster 650, the attachment nut 603, and a portion of the ultrasonic probe 610 from excessive heat. If desired, a cooling medium can be circulated within and/or around the thermal protection housing 640. The cooling medium may be a liquid (e.g., water) or a gas (e.g., argon, nitrogen, air, etc.).

The ultrasonic devices disclosed herein, including those illustrated in FIGS. 1-4, can be operated at a range of powers and frequencies. For ultrasonic devices with probe diameters of about 1" or less, the operating power often may be in a range from about 60 to about 275 watts. As an example, operating power ranges of about 60 to about 120 watts for ¾" probe diameters, and operating power ranges of about 120 to about 250 watts for 1" probe diameters, may be employed. While not being limited to any particular frequency, the ultrasonic devices may be operated at, and the ultrasonic degassing methods may be conducted at, a frequency that typically may be in a range from about 10 to about 50 kHz, from about 15 to about 40 kHz, or at about 20 kHz.

While certain embodiments of the invention have been described, other embodiments may exist. Further, any disclosed methods' stages may be modified in any manner, including by reordering stages and/or inserting or deleting stages, without departing from the invention. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as illustrative embodiments of the invention.

EXAMPLES

Examples 1-4

In Examples 1-4, a series of tests were conducted to demonstrate the reduction in the amount of dissolved hydrogen in a molten bath of aluminum that may be achieved by the disclosed methods. A control sample of the aluminum was taken and tested prior to the use of any degassing technique (Example 1). The molten metal bath of aluminum was operating at a temperature of about 1350° F. (732° C.). A conventional degassing technique, rotary gas purging, was then employed to determine the effectiveness of conventional methods of hydrogen removal (Example 2). Example 3 utilized an ultrasonic degassing process as disclosed herein, namely, an ultrasonic device in combination with the introduction of a purging gas. In Example 3, the ultrasonic device contained a niobium tip, and the tip of the ultrasonic device was placed into the aluminum bath. The ultrasonic device was operated at 20,000 Hz (frequency) in the molten bath of aluminum. Concurrently with the operation of the ultrasonic device, the purging gas argon was introduced into the molten metal bath at a rate of about 4.7 standard liters per minute (L/min). The argon was injected along the tip of the ultrasonic device (the distance between the injection point and the tip was less than about 2 cm). Example 4 utilized both the ultrasonic degassing process in combination with the conventional degassing technique.

Aluminum samples of Example 1 (no degassing), Example 2 (after conventional degassing), Example 3 (after ultrasonic degassing), and Example 4 (after ultrasonic and conventional degassing) were allowed to cool and solidify under vacuum. Then, one cubic centimeter (1 cc=1 mL) cubes from each example were measured to determine the mass and, accordingly, the density of the aluminum of each example. Aluminum has a theoretical density of 2.7 g/cc, and the presence of hydrogen gas in aluminum will reduce this density. FIG. 5 shows the percentage difference in density for each of Examples 1-4 as compared to the theoretical density of aluminum. In FIG. 5, the closer to the theoretical density of aluminum that each sample is (i.e., the lower the percentage below the density of aluminum), the more effective the degassing procedure. As demonstrated in FIG. 5, the ultrasonic procedure (Example 3) was as effective as the conventional technique (Example 2), and the use of both in combination (Example 4) may offer a slight additional improvement.

Aluminum samples of Examples 1-4 were also evaluated for the ppm hydrogen content (on a mass basis). Cast samples that were cooled and solidified under vacuum were analyzed for hydrogen content. The hydrogen content analyses are summarized in FIG. 6. In FIG. 6, the lower the hydrogen content in ppm, the more effective the degassing procedure. As demonstrated in FIG. 6, the ultrasonic procedure (Example 3) was more effective in removing hydrogen than the conventional technique (Example 2), and the use of both in combination (Example 4) did not appear to offer any additional benefit. The data of FIG. 6 are no longer relied upon. Applicants believe there was an analytical error in the determination of the listed ppm hydrogen content.

Examples 5-8

In Examples 5-8, a series of tests were conducted to determine the relative speed at which dissolved hydrogen in a molten bath of aluminum can be degassed in accordance with the disclosed methods. First, a small amount of aluminum was melted in a metal bath, and then maintained, at a temperature of about 1350° F. (732° C.). An Alspek unit was used to determine a baseline reading of hydrogen content, in units of mL/100 g. The Alspek unit uses the principle of partial pressures in an electrolytic half cell to determine the amount of dissolved hydrogen in molten aluminum. The tip of an ultrasonic device was placed into the aluminum bath, and the purging gas argon was added to the molten metal bath at a rate of about 1 standard liter per minute (L/min). For Examples 5-7, the ultrasonic device was operated with a 3:1 booster and at 20,000 Hz, although up to and including 40,000 Hz, or more, could be used. For Example 5, a baseline ultrasonic vibration amplitude was used, and a baseline power level for the ultrasonic power supply (watts); for Example 6, the ultrasonic vibration amplitude was 2 times the baseline, and the power level of the ultrasonic power supply was 1.9 times the baseline; and for Example 7, the ultrasonic vibration amplitude was 3 times the baseline, and the power level of the ultrasonic power supply was 3.6 times the baseline. For Example 8, the ultrasonic device was not used, only addition of the argon purging gas. The level of hydrogen was monitored over time using the Alspek unit, and recorded. Between each experiment, hydrogen was added into the aluminum bath, and the baseline before the addition of the argon gas was determined.

An ultrasonic device similar to that illustrated in FIG. 3 was used in Examples 5-8. The ultrasonic device did not have a cooling assembly, and the purging gas was injected thru the tip of the ultrasonic probe. The ultrasonic probe was 1" (2.5 cm) in diameter, and both the probe and tip (as a single part) were constructed of a niobium alloy containing hafnium and titanium.

Figure 7:
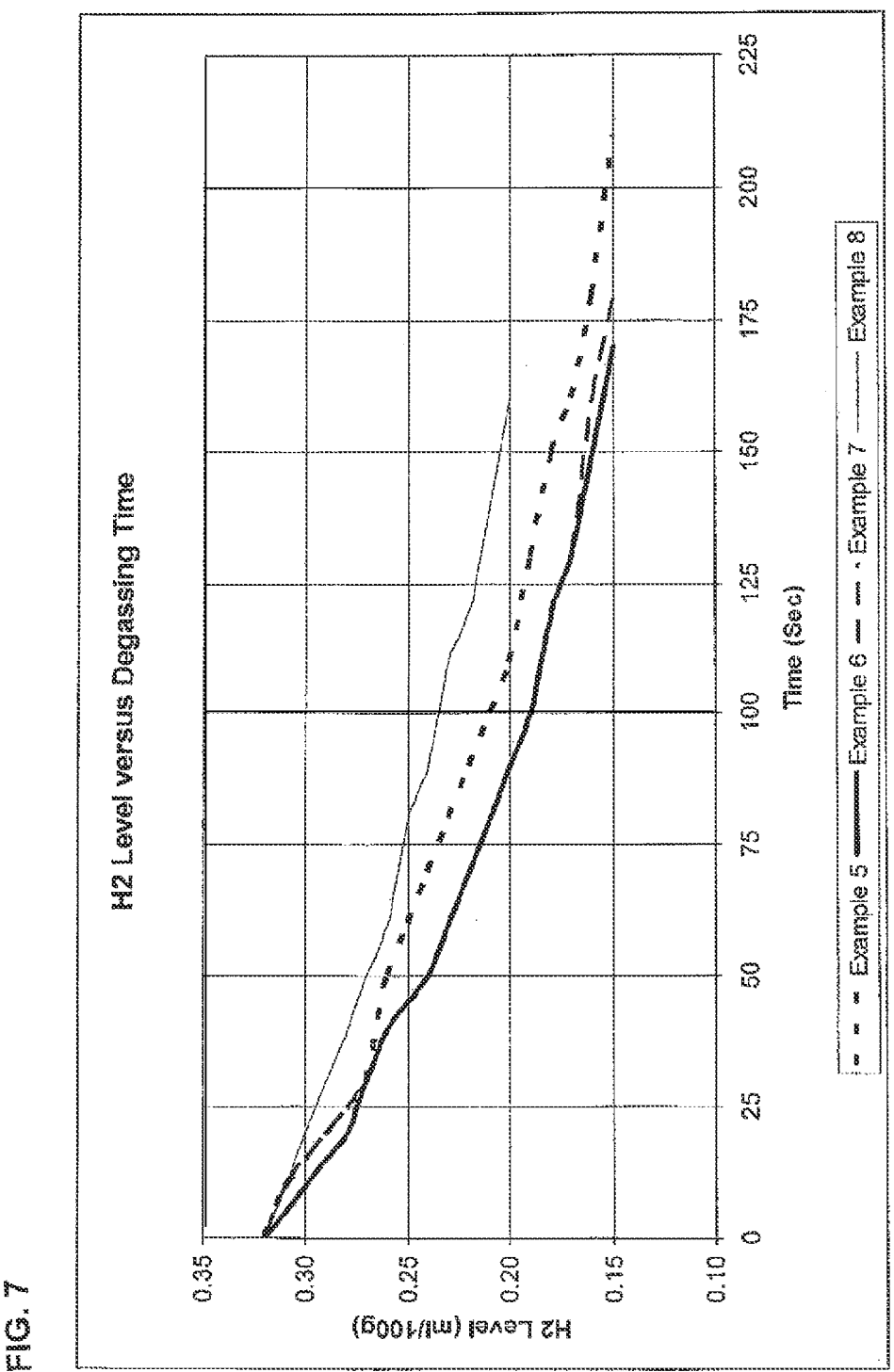
FIG. 7 is a plot of hydrogen concentration as a function of time for Examples 5-8.

FIG. 7 illustrates a plot of hydrogen concentration in mL of hydrogen per 100 g of the aluminum alloy as a function of time after the addition of the argon purging gas (and the activation of the ultrasonic device, if used). FIG. 7 demonstrates the each of Examples 5-7 degassed hydrogen from aluminum significantly faster (using a purging gas and an ultrasonic device) than that of Example 8, which only used a purging gas, but no ultrasonic device. Examples 6-7 performed slightly better than Example 5, which used a lower ultrasonic vibration amplitude and a lower baseline power level for the ultrasonic power supply.

Examples 9-10

Examples 9-10 were large scale trials to determine the effectiveness of using a purging gas and an ultrasonic device to remove hydrogen and lithium/sodium impurities in a continuous casting experiment using aluminum alloy 5154 (containing magnesium). The temperature of the metal bath was maintained at a temperature of about 1350° F. (732° C.).

Sodium and lithium concentrations in weight percent were determined using a spectrometer, and hydrogen concentrations were determined using an Alscan hydrogen analyzer for molten aluminum. Example 9 was a control experiment, and the prevailing sodium and lithium concentrations in the molten aluminum alloy of Example 9 were 0.00083% (8.3 ppm) and 0.00036% (3.6 ppm), respectively. The hydrogen concentration in Example 9 was 0.41 mL/100 g.

The ultrasonic device of Examples 5-8 was used in Example 10 and operated at 20,000 Hz. In conjunction with the operation of the ultrasonic device, in Example 10, argon gas was added to the molten metal bath at a volumetric flow rate of about 80-85 mL/hr per kg/hr of molten metal output (i.e., 80-85 mL purging gas/kg molten metal). After the use of the ultrasonic device and the argon purging gas, the sodium concentration in the molten aluminum alloy was below the minimum detection limit of 0.0001% (1 ppm), and the lithium concentration in the molten aluminum alloy was 0.0003% (3 ppm). The hydrogen concentration in Example 10 was 0.35 mL/100 g, a reduction of about 15%.

Example 11

In Example 11, a test was conducted to determine the useful life or longevity of an ultrasonic device with a unitary Sialon probe, similar to that illustrated in FIG. 4, operated in a launder containing molten aluminum at approximately 1300° F. (700° C.).

The ultrasonic device and probe were operated continuously, except for a 3-hour maintenance shutdown unrelated to the ultrasonic device. The elongated probe was ¾" in diameter, was made from Sialon, and was operated at about 20 kHz (19.97 kHz). Power levels were between 60 and 90 watts. Using a digital gauge, the length of the probe was measured before and after use. The probe tip was submerged for about 50 hours in the launder containing the molten aluminum while the ultrasonic device was operated at about 20 KHz. No purging gas was used during this experiment, as it was deemed to be unnecessary for the purpose of this test. After the 50-hour run time, the erosion of the probe was measured to be 0.0182". This converts to an erosion rate of $3.64 \times 10^{-4}$ in/hour. Generally, an ultrasonic probe can withstand up to about ¼" of erosion before it is deemed to be unfit for use. This leads to a theoretical lifetime of over 686 hours, or over 28 days, of continuous operation for the ceramic probe of Example 11.

This probe lifetime is far superior to that of other metallic and ceramic ultrasonic probes not designed, configured, or constructed as described herein.

What is claimed is:

1. An ultrasonic device comprising:
an ultrasonic transducer;
a probe attached to the ultrasonic transducer, the probe comprising a tip; and
a gas delivery system, the gas delivery system comprising:
a gas inlet,
a gas flow path through the probe, and
a gas outlet at the tip of the probe;
wherein a ratio of the cross-sectional area of the tip of the probe to the cross-sectional area of the gas outlet is in a range from about 30:1 to about 1000:1.

2. The ultrasonic device of claim 1, wherein the probe comprises stainless steel, titanium, niobium, a ceramic, or a combination thereof.

3. The ultrasonic device of claim 2, wherein the probe is a unitary part.

4. The ultrasonic device of claim 3, wherein the probe comprises a Sialon, a Silicon carbide, a Boron carbide, a Boron nitride, a Silicon nitride, an Aluminum nitride, an Aluminum oxide, a Zirconia, or a combination thereof.

5. The ultrasonic device of claim 4, wherein the probe comprises a Sialon.

6. The ultrasonic device of claim 1, wherein the probe is an elongated probe, and the elongated probe is secured to the ultrasonic transducer with an attachment nut.

7. The ultrasonic device of claim 1, wherein the probe is an elongated probe, and a length to diameter ratio of the elongated probe is in a range from about 5:1 to about 25:1.

8. The ultrasonic device of claim 1, wherein the ultrasonic device further comprises a thermal protection system surrounding at least a portion of the probe.

9. The ultrasonic device of claim 8, wherein a fluid is circulated within the thermal protection system.

10. The ultrasonic device of claim 1, wherein the ultrasonic device further comprises a booster between the ultrasonic transducer and the probe.

11. The ultrasonic device of claim 10, wherein the gas inlet is in the booster.

12. The ultrasonic device of claim 1, wherein the probe is generally cylindrical.

13. The ultrasonic device of claim 1, wherein the probe has a radius of curvature of at least about ½-inch on an attachment side of the probe.

14. A method for reducing an amount of a dissolved gas and/or an impurity in a molten metal bath, the method comprising:
(a) operating the ultrasonic device of claim 1 in the molten metal bath; and
(b) introducing a purging gas through the gas delivery system and into the molten metal bath at a rate in a range from about 0.1 to about 150 L/min.

15. The method of claim 14, wherein:
the dissolved gas comprises oxygen, hydrogen, sulfur dioxide, or a combination thereof;
the impurity comprises an alkali metal;
the molten metal bath comprises aluminum, copper, zinc, steel, magnesium, or a combination thereof;
the purging gas comprises nitrogen, helium, neon, argon, krypton, xenon, chlorine, or a combination thereof; or
any combination thereof.

16. The method of claim 14, wherein the purging gas is introduced into the molten metal bath at a rate in a range from about 10 to about 500 mL/hr of purging gas per kg/hr of output from the molten metal bath.

17. The method of claim 14, wherein:
the purging gas is introduced into the molten metal bath at a rate in a range from about 1 to about 50 L/min;
the dissolved gas comprises hydrogen;
the molten metal bath comprises aluminum, copper, or a combination thereof;
the purging gas comprises argon, nitrogen, or a combination thereof; or
any combination thereof.

18. The method of claim 17, wherein the purging gas is introduced into the molten metal bath at a rate in a range from about 1 to about 10 L/min.

19. The method of claim 17, wherein the purging gas is introduced into the molten metal bath at a rate in a range from about 30 to about 200 mL/hr of purging gas per kg/hr of output from the molten metal bath.

20. An ultrasonic device comprising:
an ultrasonic transducer;
an elongated probe comprising a tip;
a booster between the ultrasonic transducer and the elongated probe; and
a gas delivery system, the gas delivery system comprising:
a gas inlet in the booster,
a gas flow path through the probe, and
a gas outlet at the tip of the probe;
wherein a ratio of the cross-sectional area of the tip of the probe to the cross-sectional area of the gas outlet is in a range from about 30:1 to about 1000:1.

21. The ultrasonic device of claim 20, wherein the ratio of the cross-sectional area of the tip of the probe to the cross-sectional area of the gas outlet is in a range from about 60:1 to about 750:1.

22. The ultrasonic device of claim 21, wherein the probe comprises stainless steel, titanium, niobium, a ceramic, or a combination thereof.

23. The ultrasonic device of claim 20, wherein the probe is a unitary, generally cylindrical probe having a length to diameter ratio in a range from about 5:1 to about 25:1.

24. The ultrasonic device of claim 23, wherein the probe comprises a Sialon, a Silicon carbide, a Boron carbide, a Boron nitride, a Silicon nitride, an Aluminum nitride, an Aluminum oxide, a Zirconia, or a combination thereof.

25. The ultrasonic device of claim 23, wherein the probe comprises a Sialon.

26. The ultrasonic device of claim 25, wherein:
the ratio of the cross-sectional area of the tip of the probe to the cross-sectional area of the gas outlet is in a range from about 100:1 to about 700:1; and
the length to diameter ratio of the probe is in a range from about 7:1 to about 22:1.

27. A method for reducing an amount of a dissolved gas and/or an impurity in a molten metal bath, the method comprising:
(a) operating the ultrasonic device of claim 20 in the molten metal bath; and
(b) introducing a purging gas through the gas delivery system and into the molten metal bath.

28. The method of claim 27, wherein:
the dissolved gas comprises oxygen, hydrogen, sulfur dioxide, or a combination thereof;
the molten metal bath comprises aluminum, copper, zinc, steel, magnesium, or a combination thereof; and
the purging gas comprises nitrogen, helium, neon, argon, krypton, xenon, chlorine, or a combination thereof.

29. The method of claim 27, wherein:
the purging gas is introduced into the molten metal bath at a rate in a range from about 1 to about 50 L/min;
the dissolved gas comprises hydrogen;
the molten metal bath comprises aluminum, copper, or a combination thereof;
the purging gas comprises argon, nitrogen, or a combination thereof; or
any combination thereof.

* * * * *